(12) United States Patent
Cho et al.

(10) Patent No.: US 11,605,167 B2
(45) Date of Patent: Mar. 14, 2023

(54) IMAGE REGION SEGMENTATION METHOD AND SYSTEM USING SELF-SPATIAL ADAPTIVE NORMALIZATION

(71) Applicant: Korea Electronics Technology Institute, Seongnam-si (KR)

(72) Inventors: Choong Sang Cho, Seongnam-si (KR); Charles Hyok Song, Gwangju-si (KR); Young Han Lee, Yongin-si (KR)

(73) Assignee: KOREA ELECTRONICS TECHNOLOGY INSTITUTE, Seongnam-si (KR)

( * ) Notice: Subject to any disclaimer, the term of this patent is extended or adjusted under 35 U.S.C. 154(b) by 189 days.

(21) Appl. No.: 17/126,299

(22) Filed: Dec. 18, 2020

(65) Prior Publication Data

US 2022/0028084 A1 Jan. 27, 2022

(30) Foreign Application Priority Data

Jul. 24, 2020 (KR) ........................ 10-2020-0092125

(51) Int. Cl.
*G06T 7/11* (2017.01)
*H04N 19/167* (2014.01)
*H04N 19/176* (2014.01)

(52) U.S. Cl.
CPC ............. *G06T 7/11* (2017.01); *H04N 19/167* (2014.11); *H04N 19/176* (2014.11); *G06T 2207/10032* (2013.01); *G06T 2207/10132* (2013.01); *G06T 2207/20084* (2013.01)

(58) Field of Classification Search
CPC ........ G06N 3/0454; G06T 2207/10032; G06T 2207/10132; G06T 2207/20084; G06T 7/11; H04N 19/167; H04N 19/176
See application file for complete search history.

(56) References Cited

U.S. PATENT DOCUMENTS

| 2019/0012170 A1* | 1/2019 | Qadeer | G06N 3/08 |
| 2019/0050981 A1* | 2/2019 | Song | G06V 10/255 |
| 2020/0162751 A1* | 5/2020 | Kim | H04N 19/14 |

(Continued)

OTHER PUBLICATIONS

Taesung et al., "Semantic Image Synthesis with Spatially-Adaptive Normalization", (Apr. 16, 2020), 2019IEEE/ CVF Conference on CVPR, pp. 2332-2341 (Year: 2019).*

(Continued)

*Primary Examiner* — Anner N Holder
(74) *Attorney, Agent, or Firm* — Hauptman Ham, LLP

(57) ABSTRACT

An image region segmentation method and system suing self-spatial adaptive normalization is provided. The image region segmentation system includes: an encoder configured to encode an image for segmenting a region by using a plurality of encoding blocks; and a decoder configured to decode the image encoded by the encoder and to generate a region-segmented image by using a plurality of decoding blocks, wherein each of the encoding blocks processes an inputted image into a convolution layer, performs spatial adaptive normalization, and then reduces the image and delivers the image to the next encoding block. Accordingly, spatial characteristics of the image are considered in an encoding process and a decoding process, so that region segmentation can be exactly performed with respect to various images.

8 Claims, 8 Drawing Sheets

(56) References Cited

U.S. PATENT DOCUMENTS

2020/0389658 A1* 12/2020 Kim .................. H04N 19/172
2021/0074036 A1* 3/2021 Fuchs ................ G06N 3/0454
2022/0122347 A1* 4/2022 Bhatt ................ G06N 3/0454

OTHER PUBLICATIONS

Daimary et al., "Brain Tumor Segmentation from MRI Images using Hybrid Convolutional Neural Networks", (Jun. 20, 2019), Procedia Computer Science, vol. 167, pp. 2419-2428 (Year: 2020).*
Korean Office Action dated Aug. 17, 2022, in connection with the Korean Patent Application No. 10-2020-0092125, 11 pages.

* cited by examiner

FIG. 6

|  | Basic UNet | Attention Unet | Present Disclosure |
|---|---|---|---|
| DICE Result Values | 0.9079 | 0.9107 | 0.9155 |

IMAGE REGION SEGMENTATION METHOD AND SYSTEM USING SELF-SPATIAL ADAPTIVE NORMALIZATION

CROSS-REFERENCE TO RELATED APPLICATION(S) AND CLAIM OF PRIORITY

This application is based on and claims priority under 35 U.S.C. § 119 to Korean Patent Application No. 10-2020-0092125, filed on Jul. 24, 2020, in the Korean Intellectual Property Office, the disclosure of which is herein incorporated by reference in its entirety.

BACKGROUND

Field

The present disclosure relates generally to image processing technology, and more particularly, to a method and a system for exactly segmenting a target region in an input image by using an artificial intelligent (AI) model.

Description of Related Art

Image region segmentation refers to technology for automatically segmenting a region that a user wants to find in an image. This technology is increasingly used in the medical image field to assist medical staffs in diagnosing, and is more widely used in aerial images or closed-circuit television (CCTV) images.

The development of AI technology changes the paradigm of the past image region segmentation which depends on image processing algorithms That is, image region segmentation using deep learning is increasingly used in recent years.

However, technology currently suggested does not perform normalization based on spatial information, which is one of the important information data in an image, in deriving segmentation region information in a deep learning network, which may degrade region segmentation performance.

SUMMARY

To address the above-discussed deficiencies of the prior art, it is a primary object of the present disclosure to provide a method and a system for segmenting an image region, which performs self-spatial adaptive normalization (SSAN) with respect to a result of convolution processing of an image, as a solution to enhance region segmentation performance.

According to an embodiment of the present disclosure to achieve the above-described object, an image region segmentation system includes: an encoder configured to encode an image for segmenting a region by using a plurality of encoding blocks; and a decoder configured to decode the image encoded by the encoder and to generate a region-segmented image by using a plurality of decoding blocks, wherein each of the encoding blocks includes: a convolution block configured to process an inputted image into a convolution layer; a normalization block configured to perform spatial adaptive normalization with respect to an output of the convolution block; and a down-sampling block configured to reduce an output of the normalization block and to deliver the output to the next encoding block.

Each of the decoding blocks may include: an up-sampling block configured to increase an output of the encoder; a convolution block configured to receive an output of the up-sampling block and an output of the normalization block included in the encoding block, and to process the output into a convolution layer; and a normalization block configured to perform spatial adaptive normalization with an output of the convolution block and to deliver the output to the next decoding block.

The normalization block may perform the spatial adaptive normalization with respect to the output of the convolution block by using a parameter which is extracted by using the input image.

The normalization block may include: a local encoding block configured to encode by processing the output of the convolution block into a convolution layer; a first convolution block configured to extract a first spatial weight parameter by processing an output of the local encoding block into a convolution layer; a second convolution block configured to extract a second spatial weight parameter by processing the output of the local encoding block into a convolution layer; a first normalization block configured to perform batch normalization with respect to the output of the convolution block; and a second normalization block configured to perform spatial adaptive normalization with respect to an output of the first normalization block by using the first spatial weight parameter and the second spatial weight parameter which are extracted at the first convolution block and the second convolution block.

A spatial size of information inputted to the local encoding block may be the same as a spatial size of information outputted from the local encoding block.

The second normalization block may perform normalization according to the following equation:

$$X' = X \otimes (1+\alpha) \oplus \beta$$

where X' is an output of the second normalization block, X is an output of the first normalization block, $\alpha$, $\beta$ are the first spatial weight parameters, the second spatial weight parameters, and $\otimes$, $\oplus$ are element wise product and sum from a spatial aspect.

The normalization block included in the encoding block may be a normalization block disposed in the encoding block positioned at a same depth as the decoding block.

The convolution block may receive the output of the up-sampling block and the output of the normalization block included in the encoding block by applying a skip connection.

The number of encoding blocks and the number of decoding blocks may be adjustable.

According to another embodiment of the present disclosure, an image region segmentation method includes: encoding an image for segmenting a region by using a plurality of encoding blocks; and decoding the encoded image and generating a region-segmented image by using a plurality of decoding blocks, wherein each of the encoding blocks processes an inputted image into a convolution layer, performs spatial adaptive normalization, and then reduces the image and delivers the image to the next encoding block.

According to still another embodiment of the present disclosure, an image region segmentation system includes: an encoder configured to encode an image for segmenting a region by using a plurality of encoding blocks; and a decoder configured to decode the image encoded by the encoder and to generate a region-segmented image by using a plurality of decoding blocks, wherein each of the decoding blocks includes: an up-sampling block configured to increase an output of the encoder; a convolution block configured to receive an output of the up-sampling block and an output of a normalization block included in the encoding block, and to process the output into a convolution layer; and a normalization block configured to perform spatial adaptive normalization with an output of the convolution block and to deliver the output to the next decoding block.

According to yet another embodiment of the present disclosure, an image region segmentation method includes: encoding an image for segmenting a region by using a plurality of encoding blocks; and decoding the image encoded by an encoder and generating a region-segmented image by using a plurality of decoding blocks, wherein each of the decoding blocks increases an output of the encoder and processes the same with an output of a normalization block included in the encoding block into a convolutional layer, and then performs spatial adaptive normalization and delivers the output to the next decoding block.

According to various embodiments of the present disclosure as described above, spatial adaptive normalization is performed with respect to a result of convolution processing of an image, so that spatial characteristics of the image can be considered in an encoding process and a decoding process, and region segmentation can be exactly performed with respect to various images.

In addition, according to embodiments of the present disclosure, parameters necessary for spatial adaptive normalization are obtained from an input image, so that inconvenience and complexity of having to use additional information to achieve this can be solved.

Other aspects, advantages, and salient features of the invention will become apparent to those skilled in the art from the following detailed description, which, taken in conjunction with the annexed drawings, discloses exemplary embodiments of the invention.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 6 is a view illustrating a result of comparing performance between the method according to an embodiment of the present disclosure and related-art methods;

DETAILED DESCRIPTION

Hereinafter, the present disclosure will be described in detail with reference to the accompanying drawings.

Figure 1:
FIG. 1 is a view illustrating a concept of an image region segmentation system according to an embodiment of the present disclosure.
Figure 1:
Figure 1:
Figure 1:
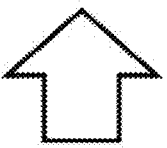
Figure 1:

FIG. 1 illustrates a concept of an image region segmentation system according to an embodiment of the present disclosure. The image region segmentation system according to an embodiment is a system for identifying and segmenting target regions from an input image, and for example, is a system for identifying and segmenting buildings from an aerial image as shown in FIG. 1.

In an embodiment, a method of performing normalization based on spatial information of an image in a process of encoding an input image and summarizing information, and then, deriving segmentation region information while decoding in a deep learning network is suggested. This method is referred to as spatial adaptive normalization in an embodiment.

Furthermore, in performing spatial adaptive normalization, information of an input image is used in an embodiment. From this aspect, it may be more appropriate to express the spatial adaptive normalization suggested in the embodiment as self-spatial adaptive normalization.

Figure 2:
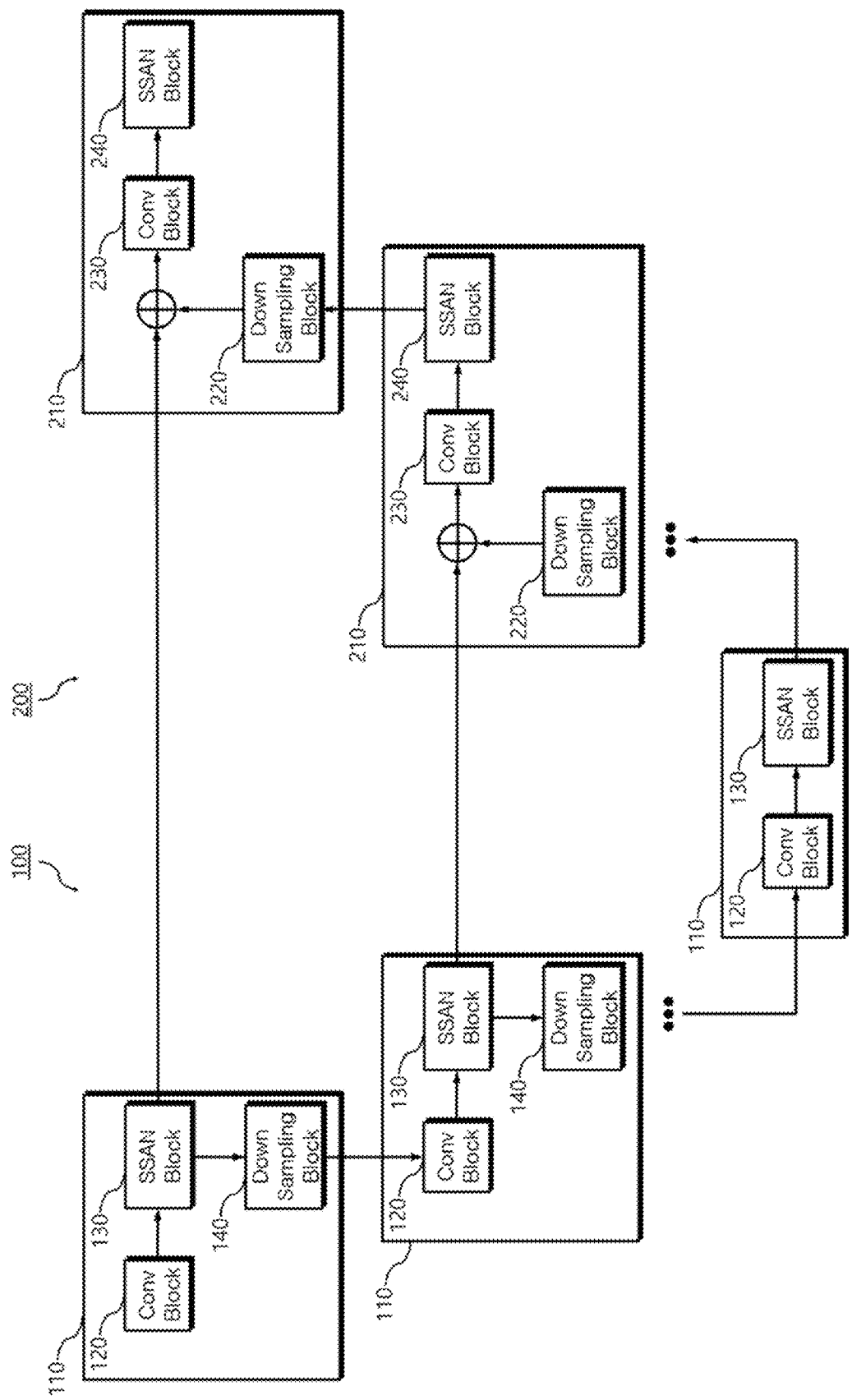
FIG. 2 is a block diagram of the image region segmentation system according to an embodiment of the present disclosure.

FIG. 2 is a block diagram of the image region segmentation system according to an embodiment. The image region segmentation system according to an embodiment may include an encoder 100 and a decoder 200 as shown in FIG. 2.

The encoder 100 is configured to encode an image for segmenting a region, and includes a plurality of self-spatial adaptive encoding (SSAE) blocks 110. The SSAE block 110 includes a convolution block 120, a self-spatial adaptive normalization (SSAN) block 130, and a down-sampling block 140.

The convolution block 120 is a block for processing the input image into a plurality of convolution layers.

The SSAN block 130 is a block for performing spatial adaptive normalization with respect to the output of the convolution block 120. The output of the SSAN block 130 may be delivered to a self-spatial adaptive decoding (SSAD) block 210 which is positioned at the same depth as the down-sampling block 140, which will be described below.

The down-sampling block 140 may reduce the output of the SSAN block 130 and may deliver the result of reduction to the SSAE block 110 positioned at the next depth (lower depth). The SSAE block 110 positioned at the last depth may not include the down-sampling block 140. Herein, an output of the SSAN block 130 may be delivered to the decoder 200.

The decoder 200 is configured to decode the input image encoded by the encoder 100 and to generate an image in which a target region is segmented, and includes a plurality of self-spatial adaptive decoding (SSAD) blocks 210. The SSAD block 210 includes an up-sampling block 220, a convolution block 230, and an SSAN block 240.

The up-sampling block 220 may increase the image reduced by the encoder 100 and may deliver the image to the convolution block 220.

The convolution block 230 receives the output of the up-sampling block 220, and the output of the SSAN block 130 of the SSAE block 110 which is positioned at the same depth as the SSAD block 210, by applying skip connection, and processes the output into a plurality of convolution layers.

The SSAN block 240 is a block for performing spatial adaptive normalization with respect to the output of the convolution block 230. The output of the SSAN block 240 is delivered to the SSAD block 210 at the next depth (upper depth).

Figure 3:
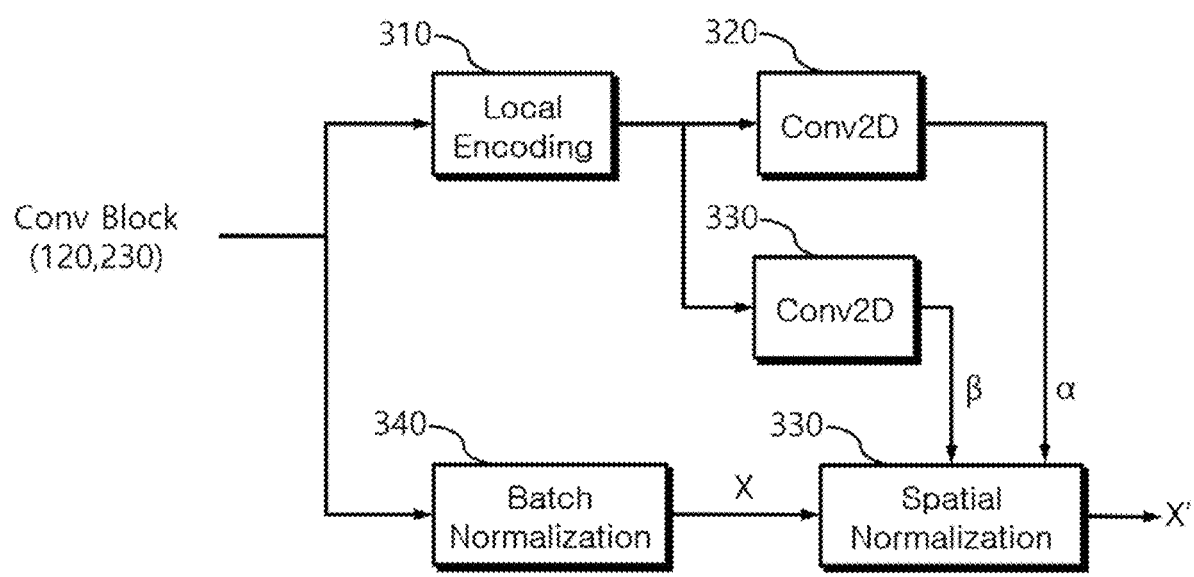
FIG. 3 is a detailed block diagram of an SSAN block.

Hereinafter, detailed structures of the SSAN block 130 and the SSAN block 240 will be described in detail with reference to FIG. 3. FIG. 3 is a detailed block diagram of the SSAN block. Since the SSAN block 130 and the SSAN block 240 can be implemented by the same structure, only one SSAN block is illustrated in FIG. 3 by using reference numeral "300".

As shown in FIG. 3, the SSAN block 300 includes a local encoding block 310, a convolution block-1 320, a convolution block-2 330, a normalization block-1 340, and a normalization block-2 350.

The local encoding block 310 receives the output of the convolution block 120 or the convolution block 230, and encodes by processing the output into a plurality of convolution layers. Specifically, the local encoding block 310 provided in the SSAN block 130 of the SSAE block 110 receives the output of the convolution block 120, and the local encoding block 310 provided in the SSAN block 240 of the SSAD block 210 receives the output of the convolution block 230.

The local encoding block 310 may be configured by connecting two or more convolution blocks, and a spatial size of information inputted to the local encoding block 310, and a spatial size of information outputted from the local encoding block 310 are designed to be the same as each other.

The convolution block-1 320 extracts one of spatial weight parameters, a, by processing the output of the local encoding block 310 into a plurality of convolution layers. The spatial weight parameter a extracted at the convolution block-1 320 is delivered to the normalization block-2 350.

The convolution block-2 330 extracts another one of the spatial weight parameters α, β by processing the output of the local encoding block 310 into a plurality of convolution layers. The spatial weight parameter 13 extracted at the convolution block-2 330 is delivered to the normalization block-2 350.

The normalization block-1 340 performs batch normalization with respect to the output of the convolution block 120 or the convolution block 230. A result of performing the batch normalization by the normalization block-1 340 is delivered to the normalization block-2 350.

The normalization block-2 350 performs spatial normalization with respect to the output of the normalization block-1 340 by using the spatial weight parameters a, 13 extracted at the convolution blocks 320, 330.

Specifically, the normalization block-2 350 performs normalization according to the following equation:

$$X' = X \otimes (1+\alpha) \oplus \beta$$

where X' is an output of the second normalization block, X is an output of the normalization block-2 350, X is a result of batch normalization which is an output of the normalization block-1 340, α, β are spatial weight parameters, and $\otimes$, $\oplus$ are element wise product and sum from the spatial aspect.

Figure 4:
FIGS. 4 and 5 is a view illustrating a result of automatically segmenting an image of the head of a fetus in an ultrasound image by using the image region segmentation system according to an embodiment of the present disclosure.
Figure 5:

FIGS. 4 and 5 illustrates a result of automatically segmenting an image of the head of a fetus in an ultrasound image by using the image region segmentation system according to an embodiment. The image has been used in the 2018 Data Science Bowl.

FIG. 6 illustrates a result of comparing with performance of related-art methods. Attention UNet is the algorithm that won the first prize in the 2018 Data Science Bowl. As suggested in FIG. 6, it can be seen that the result of performing the method according to the embodiment of the present disclosure shows more excellent performance than the result of using a basic UNet or the algorithm that won the first prize in the 2018 Data Science Bowl.

Figure 7:
FIG. 7 is a view illustrating a result of segmenting a region in an aerial image according to the method according to an embodiment of the present disclosure.

FIG. 7 illustrates a result of segmenting a region regarding an aerial image by using the image region segmentation system according to an embodiment. The image region segmentation system according to an embodiment can be applied to region segmentation of various images regardless of types of images.

The number of SSAE blocks 110 and the number of SSAD blocks 210 shown in FIG. 2 may be determined according to characteristics of an image to be applied. That is, the depth of a network in the image region segmentation system according to an embodiment may be variously implemented.

Figure 8:
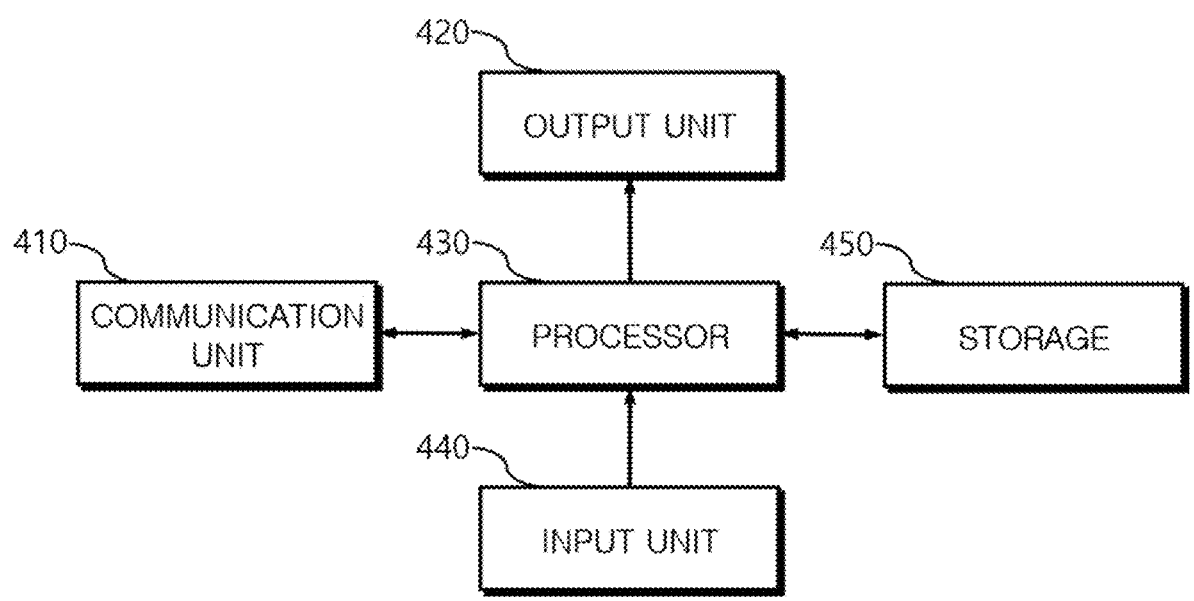
FIG. 8 is a view illustrating a hardware structure of the image region segmentation system according to an embodiment of the present disclosure.

FIG. 8 is a view illustrating a hardware structure of the image region segmentation system according to an embodiment. The image region segmentation system according to an embodiment may be implemented by a computing system (a PC, a server) including a communication unit 410, an output unit 420, a processor 430, an input unit 440, and a storage 450 as shown in FIG. 8.

The communication unit 410 is configured to connect communication with an external terminal and an external network. The input unit 440 may receive a user command and may deliver the user command to the processor 430, and the output unit 420 may output a result of processing by the processor 430, and the storage 450 may provide a storage space necessary for the processor 430.

The processor 430 is a combination of graphic processing units (GPUs) and central processing unit (CPUs) for performing region segmentation with respect to an input image according to the procedure of FIG. 2.

The technical concept of the present disclosure may be applied to a computer-readable recording medium which records a computer program for performing the functions of the apparatus and the method according to the present embodiments. In addition, the technical idea according to various embodiments of the present disclosure may be implemented in the form of a computer readable code recorded on the computer-readable recording medium. The computer-readable recording medium may be any data storage device that can be read by a computer and can store data. For example, the computer-readable recording medium may be a read only memory (ROM), a random access memory (RAM), a CD-ROM, a magnetic tape, a floppy disk, an optical disk, a hard disk drive, or the like. A computer readable code or program that is stored in the computer readable recording medium may be transmitted via a network connected between computers.

In addition, while preferred embodiments of the present disclosure have been illustrated and described, the present disclosure is not limited to the above-described specific embodiments. Various changes can be made by a person skilled in the art without departing from the scope of the present disclosure claimed in claims, and also, changed embodiments should not be understood as being separate from the technical idea or prospect of the present disclosure.

What is claimed is:

1. An image region segmentation system comprising:
an encoder configured to encode an image for segmenting a region by using a plurality of encoding blocks; and
a decoder configured to decode the image encoded by the encoder and to generate a region-segmented image by using a plurality of decoding blocks,
wherein each of the encoding blocks comprises:
a convolution block configured to process an inputted image into a convolution layer;
a normalization block configured to perform spatial adaptive normalization with respect to an output of the convolution block; and
a down-sampling block configured to reduce an output of the normalization block and to deliver the output to the next encoding block,
wherein the normalization block is configured to perform the spatial adaptive normalization with respect to the output of the convolution block by using a parameter which is extracted by using the input image,
wherein the normalization block comprises:
a local encoding block configured to encode by processing the output of the convolution block into a convolution layer;
a first convolution block configured to extract a first spatial weight parameter by processing an output of the local encoding block into a convolution layer;
a second convolution block configured to extract a second spatial weight parameter by processing the output of the local encoding block into a convolution layer;
a first normalization block configured to perform batch normalization with respect to the output of the convolution block; and
a second normalization block configured to perform spatial adaptive normalization with respect to an output of the first normalization block by using the first spatial weight parameter and the second spatial weight parameter, and
wherein the second normalization block is configured to perform normalization according to the following equation:

$$X'=X\otimes(1+\alpha)\oplus\beta$$

where X' is an output of the second normalization block, X is the output of the first normalization block, $\alpha, \beta$ are the first spatial weight parameters and the second spatial weight parameters, and $\otimes, \oplus$ are element wise product and sum from a spatial aspect.

2. The image region segmentation system of claim 1, wherein each of the decoding blocks comprises:
an up-sampling block configured to increase an output of the encoder;
a convolution block configured to receive an output of the up-sampling block and an output of the normalization block included in the encoding block, and to process the output into a convolution layer; and
a normalization block configured to perform spatial adaptive normalization with an output of the convolution block and to deliver the output to the next decoding block.

3. The image region segmentation system of claim 1, wherein a spatial size of information inputted to the local encoding block is the same as a spatial size of information outputted from the local encoding block.

4. The image region segmentation system of claim 2, wherein the normalization block included in the encoding block is a normalization block disposed in the encoding block positioned at a same depth as the decoding block.

5. The image region segmentation system of claim 2, wherein the convolution block is configured to receive the output of the up-sampling block and the output of the normalization block included in the encoding block by applying a skip connection.

6. The image region segmentation system of claim 1, wherein a number of encoding blocks and a number of decoding blocks are adjustable.

7. An image region segmentation method comprising:
encoding an image for segmenting a region by using a plurality of encoding blocks; and
decoding the encoded image and generating a region-segmented image by using a plurality of decoding blocks,
wherein each of the encoding blocks processes an inputted image into a convolution layer, performs spatial adaptive normalization, and reduces the spatial adaptive normalized image and delivers the reduced image to the next encoding block,
wherein the spatial adaptive normalization comprises:
encoding the inputted image into the convolution layer;
extracting a first spatial weight parameter by processing the encoded convolution layer into a first plurality of convolution layers;
extracting a second spatial weight parameter by processing the encoded convolution layer into a second plurality of convolution layers;
performing batch normalization with respect to the encoded convolution layer; and
performing spatial normalization with respect to the result of the performing batch normalization by using the first spatial weight parameter and the second spatial weight parameter, and
wherein the performing spatial normalization performs normalization according to the following equation:

$$X'=X\otimes(1+\alpha)\oplus\beta$$

where X' is a result of the performing spatial normalization, X is the result of the performing batch normalization, $\alpha, \beta$ are the first spatial weight parameters and the second spatial weight parameters, and $\otimes, \oplus$ are element wise product and sum from a spatial aspect.

8. An image region segmentation system comprising:
an encoder configured to encode an image for segmenting a region by using a plurality of encoding blocks; and
a decoder configured to decode the image encoded by the encoder and to generate a region-segmented image by using a plurality of decoding blocks,
wherein each of the decoding blocks comprises:
an up-sampling block configured to increase an output of the encoder;
a convolution block configured to receive an output of the up-sampling block and an output of a normalization block included in the encoding block, and to process the output into a convolution layer; and
a normalization block configured to perform spatial adaptive normalization with an output of the convolution block and to deliver the output to the next decoding block,
wherein the normalization block comprises:

a local decoding block configured to decode by processing the output of the convolution block into a convolution layer;

a first convolution block configured to extract a first spatial weight parameter by processing an output of the local decoding block into a convolution layer;

a second convolution block configured to extract a second spatial weight parameter by processing the output of the local decoding block into a convolution layer;

a first normalization block configured to perform batch normalization with respect to the output of the convolution block; and a second normalization block configured to perform spatial adaptive normalization with respect to an output of the first normalization block by using the first spatial weight parameter and the second spatial weight parameter, and wherein the second normalization block is configured to perform normalization according to the following equation:

$$X' = X \otimes (1+\alpha) \oplus \beta$$

where $X'$ is an output of the second normalization block, $X$ is the output of the first normalization block, $\alpha, \beta$ are the first spatial weight parameters and the second spatial weight parameters, and $\otimes, \oplus$ are element wise product and sum from a spatial aspect.

* * * * *